United States Patent [19]

Honda et al.

[11] Patent Number: 4,994,739
[45] Date of Patent: Feb. 19, 1991

[54] MAGNETIC SENSOR INCLUDING SENSING ELEMENT HAVING SUPPORT TERMINALS SOLDERED TO PRINTED CONDUCTORS

[75] Inventors: Naoko Honda; Tsuneo Adachi, both of Higashimatsuyama, Japan

[73] Assignee: Diesel Kiki Co., Ltd., Tokyo, Japan

[21] Appl. No.: 446,452

[22] Filed: Dec. 5, 1989

[30] Foreign Application Priority Data

Dec. 21, 1988 [JP] Japan .................. 63-164505[U]

[51] Int. Cl.$^5$ .................. G01P 3/487; G01P 1/02; G01B 7/30
[52] U.S. Cl. .................. 324/207.14; 324/173; 324/207.2; 324/251
[58] Field of Search .................. 324/173–175, 324/207.14, 207.15, 207.16, 207.2, 207.21, 207.25, 251, 252, 235; 123/617; 73/DIG. 3, 660, 661; 338/32 H; 307/309

[56] References Cited

U.S. PATENT DOCUMENTS 3,293,586 12/1966 Cohen .................. 324/251 X

FOREIGN PATENT DOCUMENTS 0110122 6/1984 European Pat. Off. ......... 324/207.2
2241629 3/1974 Fed. Rep. of Germany ...... 324/251
6082918 5/1985 Japan .
62111662 7/1987 Japan .
2107882 10/1982 United Kingdom .

Primary Examiner—Gerard R. Strecker
Attorney, Agent, or Firm—Fish & Richardson

[57] ABSTRACT

A sensor includes a housing which is narrow at least at its front portion. An insertion portion of a holder is inserted in the front portion of the housing. A plurality of elongate conductors are printed on an outer surface of the insertion portion of the holder, the conductors extending generally in the direction of the axis of the housing. A sensing element is mounted within the front portion of the housing and is disposed forwardly of the holder. The sensing element has terminals extending therefrom toward the holder in generally parallel relation to the printed conductors. The terminals are soldered respectively to the printed conductors, thereby retaining the sensing element on the holder.

7 Claims, 3 Drawing Sheets

MAGNETIC SENSOR INCLUDING SENSING ELEMENT HAVING SUPPORT TERMINALS SOLDERED TO PRINTED CONDUCTORS

BACKGROUND OF THE INVENTION

This invention relates generally to a sensor, and more particularly to an improved construction for retaining a sensing element on a housing.

Japanese Laid-Open (Kokai) Patent Application Ser. No. 82918/85 and Japanese Laid-Open Utility Model Application Ser. No. 111662/87 disclose rotation sensors which are provided with one or more magnetic sensing elements, such as a Hall element and a magnetic resistance element, capable of sensing rotation of a very low speed. Such a conventional rotation sensor comprises a cylindrical housing, and the magnetic sensing element is mounted on the front end of the housing. The housing has at its outer peripheral surface external threads by which the housing is threadedly connected to a support member disposed in the vicinity of an objected to be sensed. A rotary disc is fixedly connected to the object to be sensed, the disc having a number of projections or alternate north and south magnetic poles on the peripheral surface of the rotary disc. The magnetic sensing element is disposed near the peripheral surface of the rotary disc, and outputs a pulse signal in accordance with the rotation of the rotary disc.

The magnetic sensing element is required to be accurately retained in position at the front end of the housing. Further, particularly where such a sensor is used for sensing either the rotation of an internal combustion engine or the rotation of a fuel supply device for such internal combustion engine, it is required that the front portion of the housing projecting from the support member should be reduced in diameter so as to occupy a less space. The rotation sensors of the above-mentioned Japanese applications do not meet these requirements satisfactorily. These conventional rotation sensors will now be described in detail.

With respect to the rotation sensor disclosed in the aforesaid Japanese Laid-Open Patent Application Ser. No. 82918/85, the housing has a greater-diameter portion, an elongate smaller-diameter portion, and a shoulder portion interconnecting the greater-diameter portion and the smaller-diameter portion, the smaller-diameter portion having an end wall at its distal end. The magnetic resistance elements (magnetic sensing elements), a magnet and a core are mounted within the smaller-diameter portion of the housing in this order from the distal end thereof, and are held against one another. The magnetic resistance elements are held against the end wall of the housing. A circuit board for waveform shaping purposes is mounted within the greater-diameter portion of the housing, the circuit board being disposed perpendicularly to the axis of the housing. The magnetic resistance elements are connected to this circuit board by lead wires. The magnetic resistance elements, the magnet and the core are retained in position by a resin filled in the housing. In this conventional rotation sensor, the front portion of the housing can be made narrow. However, since the magnetic resistance elements, the magnet and the core are retained only by the resin as described above, they can not be positively retained in position before the resin is filled in the housing. As a result, it is difficult to accurately mount the magnetic resistance elements in position.

With respect to the rotation sensor disclosed in the aforesaid Japanese Laid-Open Utility Model Application Ser. No. 111662/87, an elastic holder of a cylindrical shape is received in the front portion of the housing, and a circuit board for waveform shaping purposes is mounted within the proximal portion of the housing. The holder has a plurality of holes extending therethrough in parallel relation to the axis of the housing. A metal pipe is press-fitted into each of these holes. A cover is attached to the front end of the housing, and the Hall element (magnetic sensing element) is inserted in a hole formed through a central portion of the cover. A plurality of terminal wires of the Hall element pass respectively through the metal pipes, and are connected to the circuit board. Each of the terminal wires is soldered to the front end of a respective one of the metal pipes intermediate the opposite ends of the terminal wire. In this conventional rotation sensor, since the plurality of metal pipes are passed through the elastic holder, the diameter of the holder can not be reduced, and therefore the diameter of the front portion of the housing can not be reduced. Further, a plurality of component parts are needed for retaining the Hall element, and increased time and labor are required for the assemblage. This is disadvantageous in that increased costs are incurred.

SUMMARY OF THE INVENTION

It is therefore an object of this invention to provide a sensor of the type in which the front portion of the housing can be made narrow, and the sensing element can be accurately retained in position, and the manufacturing cost is low.

According to the present invention, there is provided a sensor comprising:

(a) a housing having a narrow elongate front portion;

(b) a holder mounted within the housing, the holder having an insertion portion inserted in the front portion of the housing, the insertion portion having a plurality of elongate conductors which are printed on an outer surface of the insertion portion and extend generally in the direction of the axis of the housing; and (c) a sensing element comprising a body mounted within the front portion of the housing and disposed forwardly of the holder, and a plurality of terminals extending from the body toward the holder in generally parallel relation to the printed conductors, the terminals being soldered respectively to the printed conductors, thereby retaining the sensing element on the holder.

DESCRIPTION OF THE PREFERRED EMBODIMENT OF THE INVENTION

Figure 1:
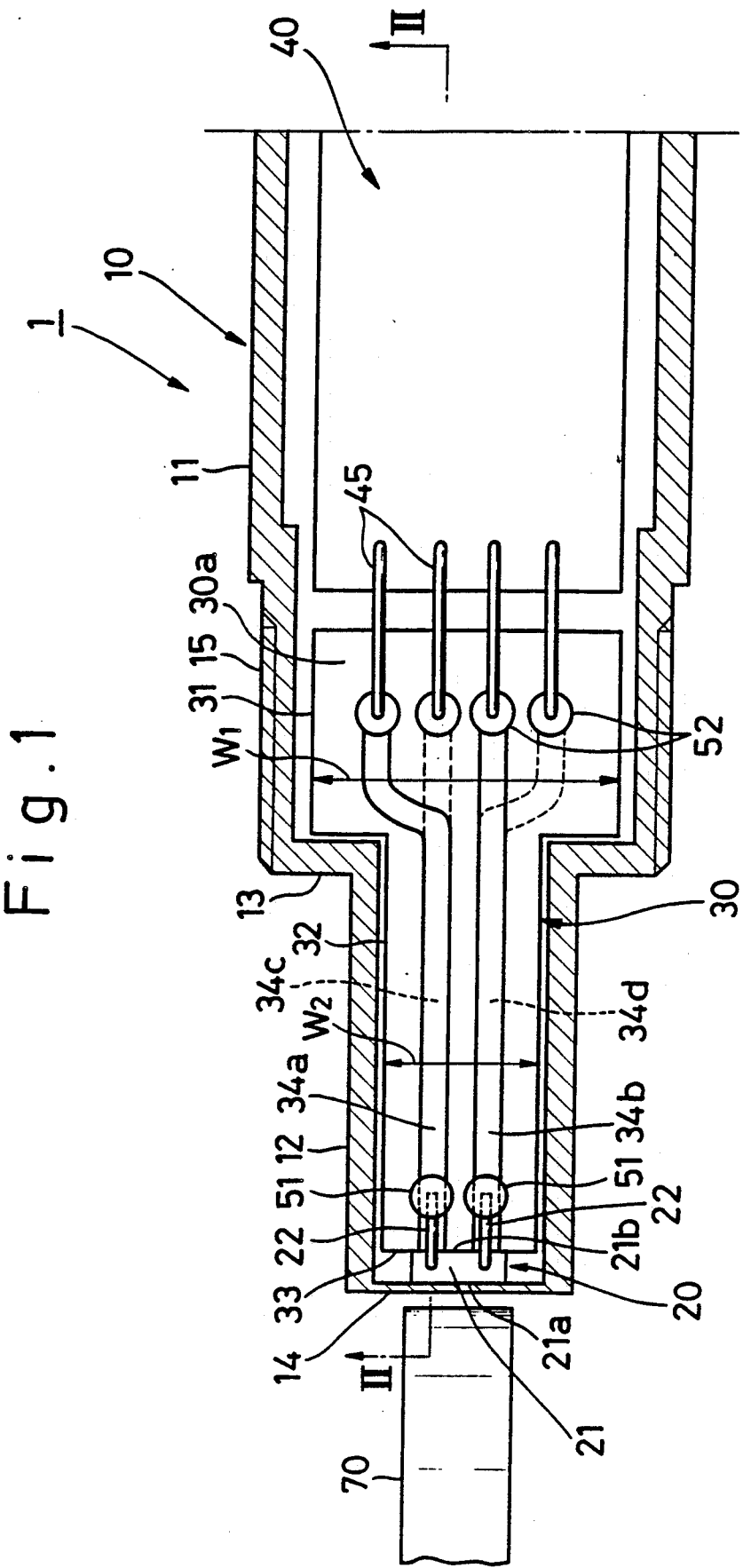
FIG. 1 is a cross-sectional view of an important portion of a rotation sensor provided in accordance with the present invention.
Figure 2:
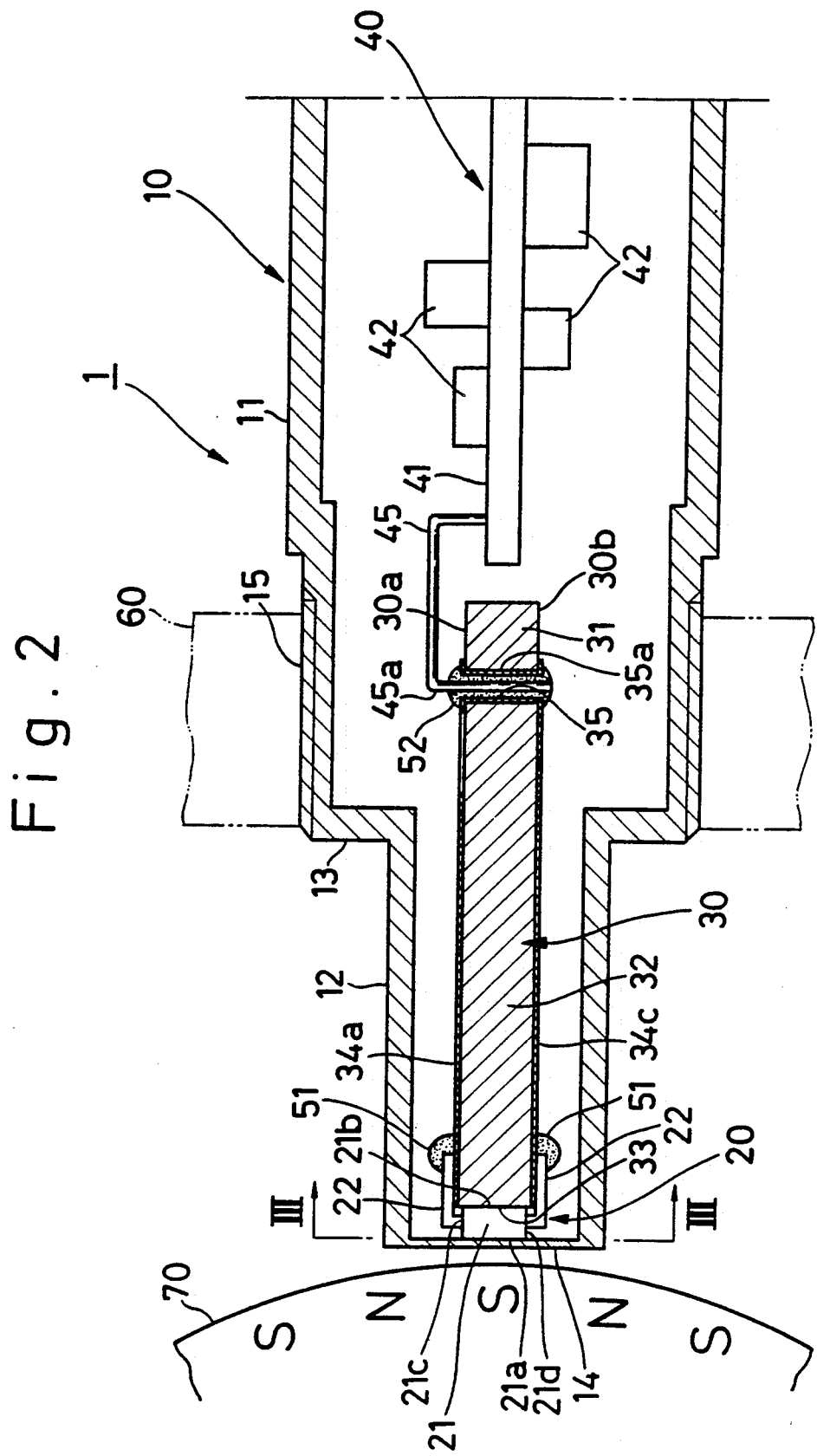
FIG. 2 is a cross-sectional view taken along the line II—II of FIG. 1.

One preferred embodiment of the present invention will now be described with reference to FIGS. 1 to 4.

A rotation sensor 1 comprises a hollow cylindrical housing 10 which is stepped intermediate the opposite ends thereof, a Hall element 20 (magnetic sensing element) received within the front end portion of the housing 10, a holder 30 received within the housing 10 to hold or retain the Hall element 20, and a circuit board 40 for shaping the waveform of a pulse signal from the Hall element 20.

The housing 10 is made of a non-magnetic metal (e.g., aluminum or stainless steel) or a resin. The housing 10 has a rear portion 11 having an open rear end, a front portion 12 which is coaxial with the rear portion 11 and is smaller in diameter than the rear portion 11, a shoulder portion 13 extending radially between the rear portion 11 and the front portion 12 to interconnect them, and an end wall 14 closing the front end of the front portion 12. The inner diameter of the front portion 12 is, for example, about 4 mm. External threads 15 are formed on the outer peripheral surface of the rear portion 11 adjacent to the shoulder portion 13.

Figure 3:
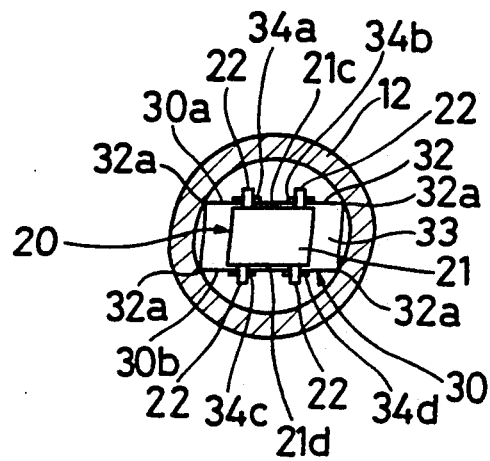
FIG. 3 is a cross-sectional view taken along the line III—III of FIG. 2.
Figure 4:
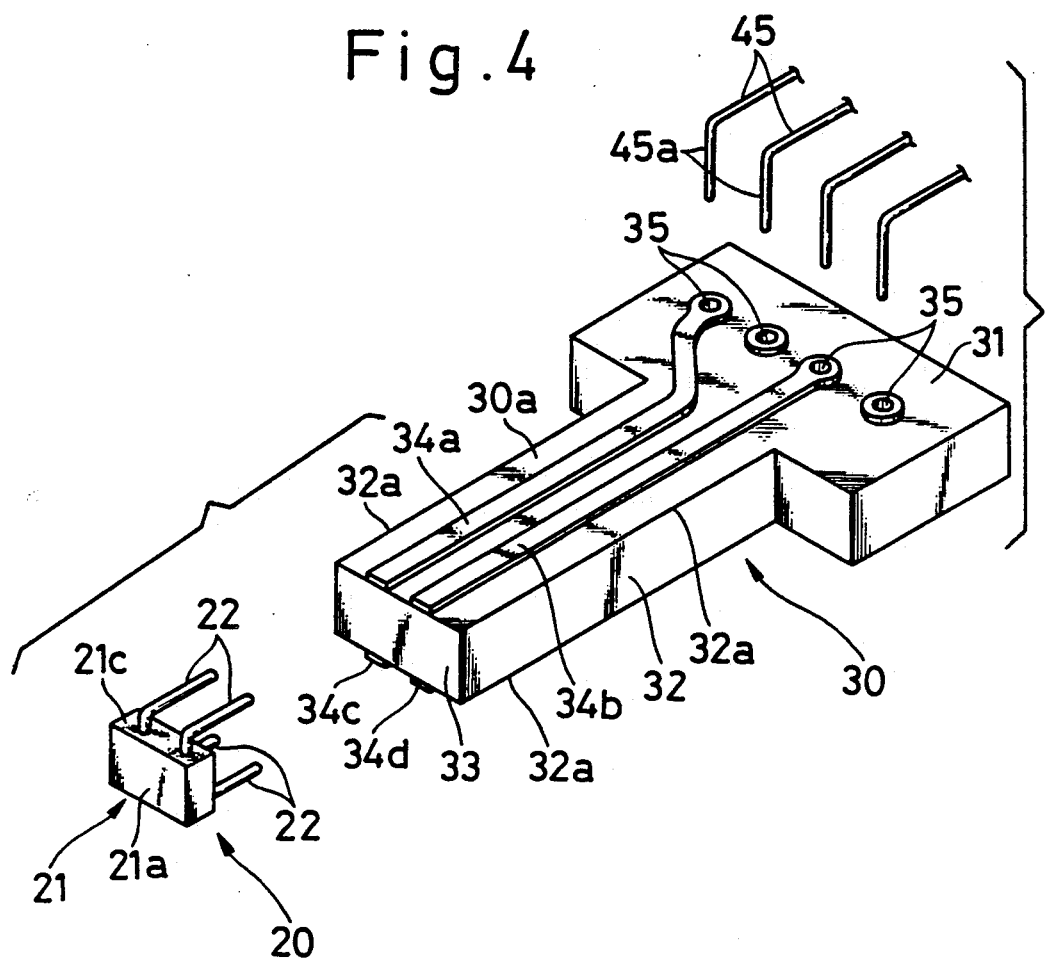
FIG. 4 is an exploded perspective view, showing a Hall element, a holder and connecting pins.

The holder 30 comprises a glass-reinforced epoxy resin plate having a uniform thickness, for example, of about 2 mm, and has a proximal portion 31 and an insertion portion 32 extending forwardly from the proximal portion 31 in the direction of the axis of the housing 10. The insertion portion 32 has a width W2 slightly smaller than the inner diameter of the front portion 12 of the housing 10. The width W1 of the proximal portion 31 is greater than the width W2 of the insertion portion 32 but is smaller than the inner diameter of the rear portion 11 of the housing 10. As shown in FIG. 3, the insertion portion 32 has a rectangular transverse cross-section. The proximal portion 31 of the holder 30 is disposed in the rear portion 11 of the housing adjacent to the shoulder portion 13.

The insertion portion 32 of the holder 30 is inserted in the front portion 12 of the housing 10. The four edges 32a of the insertion portion 32 each defined by the intersection of respective two adjacent sides of the insertion portion 32 are held in contact with the inner peripheral surface of the front portion 12 of the housing 10, as shown in FIG. 3. With this arrangement, the holder 30 is retained in position with respect to the housing 10. A front end face 33 of the insertion portion 32 is disposed perpendicularly to the axis of the housing 10, and is spaced apart from the end wall 14 of the housing 10.

A pair of opposite surfaces 30a and 30b of the holder 30 determining the thickness of the holder 30 serve as printing surfaces, respectively. More specifically, two elongate conductors 34a and 34b are printed on one printing surface 30a in spaced apart relation to each other. Also, two elongate conductors 34c and 34d are printed on the other printing surface 30b in spaced relation to each other. The thickness of each of the conductors 34a to 34d is exaggerated in the drawings.

The conductors 34a and 34c are disposed in registry with each other except for their rear end portions, and the conductors 34b and 34d are disposed in registry with each other except for their rear end portions. The four conductors 34a to 34d extend rearwardly from the front end of the insertion portion 32 to a region midway of the rear portion 31. More specifically, the conductors 34b and 34c extend straight in the direction of the axis of the housing 10 throughout the entire lengths thereof. The conductors 34a and 34d extend straight in the direction of the axis of the housing 10 over the entire length of the insertion portion 32, and are curved away from each other at the proximal portion 31. Four through holes 35 are formed through the proximal portion 31 of the holder 30 and extend perpendicularly to the printing surfaces 30a and 30b. The four through holes 35 are juxtaposed in a row extending in the transverse direction of the housing 10, that is, in a direction perpendicular to the axis of the housing 10. A conductor 35a is formed on the inner surface of each of the four through holes 35. The four through holes 35 extend respectively through the circular rear ends of the four conductors 34a to 34d, and the conductors 35a formed respectively on the inner surfaces of the through holes 35 are electrically connected to the printed conductors 34a through 34d at the ends of the through holes 35.

As will be appreciated from the foregoing, the holder 30 having the printed conductors 34a to 34d constitutes a printed board of an ordinary type.

The Hall element 20 includes a body 21 of a rectangular parallelepipedic shape. The body 21 is held between the end wall 14 of the housing 10 and the front end face 33 of the holder 30. More specifically, one surface 21a of the body 21 serves as a sensing surface, and is held in contact with the end wall 14 of the housing 10. The opposite or reverse surface 21b parallel to the sensing surface 21a is held in contact with the front end face 33 of the holder 30. The body 21 may be spaced apart from the front end face 33 of the holder 30.

The body 21 has opposite side surfaces 21c and 21d which are disposed perpendicularly to the sensing surface 21a and are parallel to the printing surfaces 30a and 30b of the holder 30. A pair of terminals 22 are projected perpendicularly from each of the opposite side surfaces 21c and 21d. Each pair of terminals 22 are bent perpendicularly adjacent to the side surface 21c, 21d and extend toward the holder 30 in parallel relation to the printing surfaces 30a and 30b. The front end portion of the insertion portion 32 is inserted in between the thus opposed pairs of terminals 22. With this arrangement, the four terminals 22 are disposed in contact with and extend along the four printed conductors 34a to 34d, respectively. The four terminals 22 are electrically connected respectively to the printed conductors 34a to 34d by solder 51. The Hall element 20 is retained on the holder 30 by the solder 51. As shown in FIG. 3, the four terminals 22 of the Hall element 20 are disposed in spaces formed between the insertion portion 32 of the holder 30 and the inner peripheral surface of the front portion 12 of the housing 10, and are held out of contact with the inner peripheral surface of the front portion 12 of the housing 10.

The circuit board 40 comprises a printed board 41 of a ceramics material, and a plurality of integrated circuit (IC) elements 42 mounted on the printed board 41 and electrically connected to conductors printed on the printed board 41. Thus, the circuit board 40 constitutes a so-called hybrid integrated circuit. The circuit board 40 is received within the housing 10, and is disposed rearwardly of the proximal portion 31 of the holder 30. The circuit board 40 is disposed in substantially the same plane as the plane of the holder 30. Four connecting pins 45 are mounted on the front end portion of the circuit board 40. Each connecting pin 45 projects from the circuit board 40 perpendicularly to the plane of the circuit board 40, and is perpendicularly bent so as to extend toward the holder 30 in parallel relation to the printing surface 30a of the holder 30, and is further bent perpendicularly so that the front portion of the connecting pin 45 serves as an insertion portion 45a. The insertion portions 45a of the four connecting pins 45 are inserted respectively in the four through holes 35 and are electrically and mechanically connected by solder 52 to the respective conductors 34a to 34d and the respective conductors formed respectively on the inner surfaces of the through holes 35. Lead wires (not shown) are connected to the rear end of the circuit board 40, and extend exteriorly of the housing 10 through the open rear end of the housing 10. This open rear end is closed by a lid (not shown).

The manner of assembling the rotation sensor 1 of the above construction will now be described. First, the reverse surface 21b of the body 21 of the Hall element 20 is held against the front end face 33 of the holder 30, and in this condition the terminals 22 are soldered to the conductors 34a to 34d of the holder 30, respectively. The insertion portions 45a of the connecting pins 45 are inserted respectively into the through holes 35, and are soldered respectively to the circular rear portions of the four conductors 34a to 34d. Then, the Hall element 20, the holder 30 and the circuit board 40 which are thus connected together are inserted into the housing 10 until the sensing surface 21a of the Hall element 30 is brought into contact with the end wall 14 of the housing 10. Thereafter, an epoxy resin (not shown) is filled in the housing 10. Prior to the filling of the epoxy resin into the housing 10, the Hall element 20 is held or retained by the holder 30, and besides the edges 32a of the insertion portion 32 of the holder 30 are held in contact with the inner peripheral surface of the housing 10. Therefore, the Hall element 20 is accurately held in position with respect to the housing 10.

For supporting the sensor 1 of the above construction, the threaded portion 15 of the housing 10 is threaded into a threaded hole in a support member 60 (FIG. 2) disposed in the vicinity of an object (not shown) to be sensed (for example, an engine shaft or a drive shaft of a fuel injector). A rotary disc 70 is fixedly mounted on the object to be sensed, and has alternate north and south magnetic poles arranged on the outer peripheral surface thereof. The Hall element 20 is disposed near the outer peripheral surface of the rotary disc 70. The Hall element 20 is supplied with constant current from the circuit board 40 via two of the four connecting pins 45, two of the four printed conductors 34a to 34d and two of the four terminals 22. The Hall element 40 detects a change of the magnetic field developing in accordance with the rotation of the rotary disc 70, and outputs a pulse signal. This pulse signal is fed to the circuit board 40 via the other two terminals 22, the other two printed conductors and the other two connecting pins 45.

In the rotation sensor 1, the supporting of the Hall element 20 and the electrical connection between the Hall element 20 and the circuit board 40 are achieved by the holder 30 comprising a single printed board. Therefore, the number of the component parts is less than that of the conventional rotation sensor, and hence the manufacturing cost is lower. Further, since the insertion portion 32 of the holder 30 only need have the printed conductors 34a to 34d thereon, the insertion portion 32 can be made narrow. This makes it possible to make narrow the front portion 12 of the housing 10 projecting from the support member 60, thereby reducing the space occupied by the front portion 12. Further, the terminals 22 of the Hall element 20 are connected to the printed conductors 34a to 34d in such a manner that the terminals extend along the printed surfaces 30a and 30b. With this arrangement, the Hall element 20 can be disposed forwardly of the holder 30. In this respect, also, the front portion 12 of the housing 10 can be made narrow.

Further, since the connection between the Hall element 20 and the circuit board 40 is made through the holder 30 comprising a single printed board, this connecting operation can be done easily.

Further, since the connection between the holder 30 and the circuit board 40 is made by the connecting pins 45 without the use of other board between the holder 30 and the circuit board 40, the length of the housing 10 can be reduced.

While the rotation sensor according to the present invention has been specifically shown and described herein, the invention itself is not to be restricted to the exact showing of the drawings and the description thereof, and various modifications can be made. For example, the holder 30 and the circuit board 40 can be connected together by a pair of female and male connectors secured respectively to them. Also, the holder and the circuit board can be formed integrally with each other.

The present invention is applicable to sensors with a magnetic sensing element such as a magnetic resistance element. Also, the present invention is applicable to sensors with a photo-sensing element, in which case the housing has at the front end an opening for introducing light thereinto.

In some cases, the terminals of the sensing element may be two or three.

What is claimed is:

1. A magnetic sensor comprising:
   (a) a housing having a narrow elongate front portion;
   (b) a holder mounted within said housing, said holder having an insertion portion inserted in said front portion of said housing, an outer surface of said insertion portion having a pair of oppositely facing surface sections on which elongate conductors are printed and which extend generally in the direction of the axis of said housing; and
   (c) a magnetic sensing element comprising a body mounted within said front portion of said housing and disposed forwardly of said holder and terminals extending from opposite sides of said body toward said holder in generally parallel relation to said printed conductors so that said insertion portion is disposed between said terminals, said terminals being soldered respectively to said printed conductors, the terminals thereby supporting said sensing element on said holder.

2. A magnetic sensor according to claim 1, in which said front portion of said housing is cylindrical, said insertion portion of said holder having a rectangular transverse cross-section, the four edges of said insertion portion each defined by the intersection of respective two adjacent sides of said insertion portion being substantially held in contact with the inner peripheral surface of said front portion of said housing.

3. A magnetic sensor according to claim 2, in which each of said terminals of said sensing element is disposed in a space formed between the inner peripheral surface of said housing and said holder, and is spaced apart from said inner peripheral surface of said housing.

4. A magnetic sensor according to claim 2, in which said sensing element has a sensing surface disposed perpendicularly to the axis of said front portion of said housing and directed away from said holder, said body having a pair of opposite side surfaces disposed substantially perpendicularly to said sensing surface and parallel to said surface sections of said holder, said terminals extending respectively from said pair of said surfaces and being bent perpendicularly adjacent to said side surface to be connected to a respective one of said conductors formed on said pair of surface sections of said holder so as to support said sensing element on said holder.

5. A magnetic sensor according to claim 4, in which said housing has at its front end an end wall disposed perpendicularly to the axis of said housing, said holder having a front end face disposed parallel to said end wall of said housing, said body of said sensing element has a rectangular parallelepipedic shape, said sensing surface of said body of said sensing element being held in contact with said end wall, and said body having a reverse surface facing away from said sensing surface and held in contact with said front end face of said holder.

6. A magnetic sensor comprising:
(a) a cylindrical housing which has a narrow elongate front portion and which is stepped intermediate opposite ends thereof so that said housing has a rear portion which is greater in diameter than said front portion;
(b) a holder mounted within said housing, said holder having an insertion portion inserted in said front portion of said housing and having a proximal portion extending rearwardly from said insertion portion which is received in said rear portion of said housing, an outer surface of said insertion portion having a plurality of oppositely facing surface sections on which elongate conductors are printed and which extend generally in the direction of the axis of said housing from the front end of said insertion portion to said proximal portion;
(c) a magnetic sensing element comprising a body mounted within said front portion of said housing and disposed forwardly of said holder and a plurality of terminals extending from opposite sides of said body toward said holder in generally parallel relation to said printed conductors so that said insertion portion is disposed between said terminals, said terminals being soldered respectively to said printed conductors, the terminals thereby supporting said sensing element on said holder; and
(d) a circuit board for processing a signal from said magnetic sensing element which is mounted within said rear portion of said housing and disposed rearwardly of said proximal portion of said holder, a plurality of connecting pins being mounted on a front end portion of said circuit board,
wherein a plurality of through holes is formed in said proximal portion of said holder and a conductor is formed on the inner surface of each of said through holes, said plurality of connecting pins being inserted in said plurality of through holes and soldered to rear ends of said printed conductors so that said magnetic sensing element is electrically connected to said circuit board by means of said printed conductors and said connecting pins.

7. A magnetic sensor according to claim 6, in which said holder comprises a plate of a uniform thickness, said proximal portion of said holder being greater in width than said insertion portion, said plurality of through holes being juxtaposed in a row extending perpendicularly to the axis of said housing, and said circuit board being disposed in generally the same plane as the plane of said holder.

* * * * *